US007734537B2

(12) United States Patent
Pavlov et al.

(10) Patent No.: US 7,734,537 B2
(45) Date of Patent: Jun. 8, 2010

(54) VALUATION METHODS, APPARATUS, MEDIA AND SIGNALS, AND METHODS RELATING TO ASSET-SECURED LOANS

(75) Inventors: Andrey Dimitrov Pavlov, Burnaby (CA); Susan Melinda Wachter, Berwyn, PA (US); Peter Ian Ekstein, Coogee (AU)

(73) Assignee: Simon Fraser University, Burnaby, BC (CA)

( * ) Notice: Subject to any disclaimer, the term of this patent is extended or adjusted under 35 U.S.C. 154(b) by 295 days.

(21) Appl. No.: 11/600,180

(22) Filed: Nov. 16, 2006

(65) Prior Publication Data
US 2008/0120225 A1    May 22, 2008

(51) Int. Cl.
*G06Q 40/00* (2006.01)
(52) U.S. Cl. ........................................... 705/38; 705/35
(58) Field of Classification Search ........................ None
See application file for complete search history.

(56) References Cited

U.S. PATENT DOCUMENTS

| | | | | |
|---|---|---|---|---|
| 5,926,800 | A * | 7/1999 | Baronowski et al. | 705/35 |
| 7,392,216 | B1 * | 6/2008 | Palmgren et al. | 705/37 |
| 2006/0085325 | A1 * | 4/2006 | Jammal et al. | 705/38 |
| 2006/0184442 | A1 * | 8/2006 | Krasnerman et al. | 705/35 |

OTHER PUBLICATIONS

Titman, Sheridan et al., Valuing Commercial Mortgages: An Empirical Investigation of the Contingent-Claims Approach to Pricing Risky Debt, The Journal of Finance, vol. XLIV, No. 2, Jun. 1989, pp. 345-373.*
Hall, Arden, Valuing the Mortgage Borrower's Prepayment Option, AREUEA Journal, vol. 13, No. 3, 1985, pp. 229-246.*
Epperson, James et al., Pricing Default Risk on Mortgages, Journal of the American Real Estate & Urban Economics Association (AREUEA), vol. 13, No. 3, Fall 1985, pp. 261-272.*
Cauley, Stephen Day "California Housing Policy", Director of Research, Richard S. Ziman Center for Real Estate, UCLA Anderson Graduate School of Management, pp. 83-99.

(Continued)

*Primary Examiner*—Stefanos Karmis
*Assistant Examiner*—Carol See

(57) ABSTRACT

A computer-implemented method includes determining, in respect of a loan secured by an asset, a present value of a right of a borrower of the loan to choose during a term of the loan to require an entity to pay the loan in full on the borrower's behalf in exchange for the asset, in response to at least one prediction of whether the borrower will exercise the right. The asset may include realty and the loan may include a mortgage. A further method includes granting, to a borrower of a loan secured by an asset, a right to choose during a term of the loan to require an entity to: (i) pay the loan in full on behalf of the borrower, and (ii) receive the asset in full satisfaction therefor; and receiving valuable consideration from the borrower in exchange for the granting of the right.

17 Claims, 6 Drawing Sheets

OTHER PUBLICATIONS

Chatterjee, S., et al., "Influential Observations, High Leverage Points, and Outliers in Linear Regression", Statistical Science, 1986, pp. 379-393.

Hartarska, Valentina, et al. "Credit Counseling and Mortgage Termination by Low-Income Households", Journal of Real Estate Finance and Economics, 2005, 30 (3).

Kau, James B., et al. "A Generalized Valuation Model for Fixed-Rate Residential Mortgages", Journal of Money, Credit, and Banking, 1992, vol. 24, No. 3, pp. 279-299.

Pavlov, Andrey D. "Competing Risks of Mortgage Termination: Who Refinances, Who Moves, and Who Defaults?", Journal of Real Estate Finance and Economics, 2001, 23:2, pp. 185-211.

Pavlov, Andrey D. "Space-Varying Regression Coefficients: A Semi-parametric Approach Applied to Real Estate Markets", Real Estate Economics, 2000 v26 2: pp. 249-283.

Quigley, John M. "Interest Rate Variations, Prepayments and Household Mobility", The Review of Economics and Statistics, Nov. 1987, vol. 69, No. 4, pp. 636-643.

Schwartz, Eduardo S., et al., "Prepayment and the Valuation of Mortgage-Backed Securities", The Journal of Finance, Jun. 1989, vol. XLIV, No. 2, pp. 375-392.

Sirmans, C. F., et al., "Residential Development, Risk, an Land Prices", Journal of Regional Science, 1997, vol. 37, No. 4, pp. 613-628.

\* cited by examiner

| Principal | Proportion | Interest Rate | Term in Months | Asset Current Value | Trial # | Present Value of Right | Price Adjustment | Sale Price |
|---|---|---|---|---|---|---|---|---|
| $ | 1.0 | % | | $ | 1 | $ | $ | $ |
| 302 | 304 | 306 | 308 | 310 | 312 | 314 | 316 | 318 |

330 → Interest Rate Parameters

| Volatility $\sigma_r$ | $a_{r1}$ | $a_{r2}$ |
|---|---|---|
| | | |

340 → Asset Value Parameters

| Volatility $\sigma_v$ | $a_{v1}$ | $a_{v2}$ | $a_{v3}$ |
|---|---|---|---|
| | | | |

FIG. 3

VALUATION METHODS, APPARATUS, MEDIA AND SIGNALS, AND METHODS RELATING TO ASSET-SECURED LOANS

FIELD OF THE INVENTION

Aspects of the present invention include methods, apparatuses, computer-readable media and signals relating to valuation, and to loans secured by assets.

BACKGROUND OF THE INVENTION

Numerous types of loans are secured by assets. For example, purchasers of residential homes or other types of real property ("realty") usually borrow a significant portion of the purchase price, via a mortgage. The purchaser ("mortgagor") borrows funds from a lender such as a bank, trust company or private investor, and grants a mortgage in the realty to the lender ("mortgagee"), so that the realty acts as security for the loan. Likewise, purchasers of chattels such as automobiles often receive a loan to cover a portion of the purchase price, and the loan is secured by a similar chattel mortgage. Even beyond the more conventional use of real or personal property as security, lenders are often willing to accept other forms of assets as security for loans, including intangible property such as intellectual property rights (e.g. patents, trademarks, copyrights, design registrations, etc.), choses in action, stocks, bonds, debentures, mutual fund units, and a myriad of other examples. By way of illustration, the present specification discusses primarily realty and related mortgages, although it will be appreciated that the problems and solutions discussed herein may apply equally to other types of loans secured by other types of assets.

In the context of residential realty mortgages, mortgage insurance policies are sometimes purchased by the borrower, either voluntarily or as a mandatory pre-condition imposed by the lender. Typically, such mortgage insurance policies are triggered by the occurrence of an event beyond the borrower's control which adversely affects the borrower's ability to repay the loan, such as involuntary loss of employment, injury or death, for example. The direct beneficiary of such policies is generally the lender. In the event of default by the borrower, the lender forecloses on the property and sells it, and the insurance covers any loss that the lender may suffer if the net sale proceeds are less than the outstanding loan balance.

Thus, it is the lender, not the borrower, who is the direct beneficiary of such policies. The borrower does not benefit from such insurance, and may still be subjected to foreclosure or other actions by the lender.

SUMMARY OF THE DISCLOSURE

The present inventors have identified a need for a commercial product that provides improved benefits to borrowers in respect of asset-secured loans.

As an example to illustrate this need, real estate owners can suffer significant adverse effects from real estate market fluctuations. For example, if a particular purchaser borrowed money via a mortgage to buy a home during a real estate "bubble" or other time period during which real estate prices were inflated, but then the real estate market subsequently experienced a "crash" or other downward correction, the result may be that the total outstanding balance owing to the lender significantly exceeds the market value of the home. From the perspective of the homeowner/borrower, it may well be desirable in such a situation to be able to "walk away" and default on the loan, and let the lender keep the home against which the loan is secured, because the home is not worth as much as the balance owing on the mortgage. If the borrower does so, however, when the lender forecloses and re-sells the home, the sale price will be significantly less than the amount that the borrower owed to the lender under the mortgage. Accordingly, the lender will attempt to recover from the borrower the difference between the proceeds of the sale of the asset and the amount that was owing under the mortgage. If necessary, the lender will take legal action against the borrower to recover this difference, potentially forcing the borrower into bankruptcy. The borrower's default on the loan will also adversely affect the borrower's credit rating, thereby increasing the cost of borrowing for the borrower in the future. Existing mortgage insurance products do not address these difficulties.

In accordance with one aspect or illustrative embodiment of the invention, therefore, there is provided a method. The method includes granting, to a borrower of a loan secured by an asset, a right to choose during a term of the loan to require an entity to (i) pay the loan in full on behalf of the borrower, and (ii) receive the asset in full satisfaction therefor. The method further includes receiving valuable consideration from the borrower in exchange for the granting of the right.

Advantageously, because such a method grants to the borrower a right to choose to require the entity to repay the loan and receive the asset in exchange, the borrower's right is independent of the occurrence of any predefined event. Thus, the borrower may choose to exercise the right at any time, rather than being restricted to exercising the right only upon the occurrence of a pre-defined event such as involuntary loss of employment or injury.

Also advantageously, because the borrower can choose to require the entity to accept the asset in full satisfaction for having paid the loan in full on the borrower's behalf, there is no further obligation of the borrower, regardless of whether a value of the asset is less than an amount paid by the entity to a lender of the loan to pay the loan in full. The lender has been paid in full, and therefore will not take any action adverse to the borrower. The entity that granted the right to the borrower will pay the loan in full on the borrower's behalf, and will receive the asset (or the proceeds of its sale) in exchange. If the proceeds of sale of the asset are less than the balance owing on the loan, which the entity had to pay to the lender, the entity will absorb the loss or shortfall.

In addition to the foregoing advantages for borrowers, the method is also advantageous to the entity that is granting the right to the borrower. The entity receives valuable consideration from the borrower in exchange for the granting of the right. Thus, the entity may sell such rights for profit, such that the entity's revenue flow from selling such rights significantly exceeds its expenses or losses in the relatively small percentage of cases in which such rights will actually be exercised by the borrower.

In illustrative embodiments, the asset may include realty and the loan may include a mortgage secured by the realty. Advantageously, a "true non-recourse mortgage" is effectively provided in such embodiments, whereby a homeowner or other realty owner may choose to "walk away" from a mortgage, but without being deemed to have "defaulted", because the entity that granted the right to the borrower will pay the loan in full on the borrower's behalf. Thus, the homeowner or other realty owner can choose to simply walk away from the mortgage, but without suffering any adverse financial consequences. The homeowner will not be required to make up the shortfall between the proceeds of the sale of the home and the amount that was owing on the mortgage, and the homeowner will not suffer any credit rating downgrade or any other adverse financial effects.

The entity may be a different entity than a mortgagee of the mortgage. For example, the entity may be an insurer.

Alternatively, the entity may be a mortgagee of the mortgage. Thus, the lender itself may grant the right to the borrower.

In other illustrative embodiments, the asset may include a chattel and the loan may be secured by the chattel.

Alternatively, other types of assets may be substituted.

The method may further include paying the loan in full on behalf of the borrower, and receiving the asset in full satisfaction therefor, in response to exercise of the right by the borrower.

Receiving the asset may include receiving a transfer of ownership of the asset. Alternatively, receiving the asset may include receiving proceeds of a sale of the asset.

As methods such as those described above have not previously existed, existing valuation methods, such as those for determining appropriate mortgage insurance premiums for example, provide no guidance as to the appropriate amount (i.e. the valuable consideration) that the entity should charge for granting such a right.

Therefore, in accordance with another aspect or illustrative embodiment of the invention, there is provided a computer-implemented method. The method includes determining, in respect of a loan secured by an asset, a present value of a right of a borrower of the loan to choose during a term of the loan to require an entity to pay the loan in full on the borrower's behalf in exchange for the asset, in response to at least one prediction of whether the borrower will exercise the right.

The method may further include generating the at least one prediction.

Generating may include generating the at least one prediction in response to a present value of the asset and an interest rate of the loan.

Generating may include generating a plurality of predictions whether the borrower will exercise the right at a plurality of respective times during the term of the loan.

For example, generating may include simulating a plurality of scenarios, each scenario reflecting possible changes in value of the asset and in interest rates over the term of the loan. In such embodiments, generating may include generating the plurality of predictions whether the borrower will exercise the right at the plurality of respective times, for each one of the plurality of scenarios.

Simulating may include simulating at least $2 \times 10^4$ scenarios. For example, simulating may include simulating at least $1 \times 10^5$ scenarios.

Simulating may include simulating the plurality of scenarios in response to previous data representing previous changes in values of similar types of assets and previous changes in interest rates. For example, in embodiments where the asset is realty, the data may include previous real estate index values (or other real estate pricing data) for the local geographic area in which the asset is located, as well as previous interest rates prevailing in that geographic area.

Simulating may include modeling the possible changes in value of the asset over the term of the loan as a function including parameters derived from the previous data and a random variable.

Similarly, simulating may include modeling the possible changes in interest rates over the term of the loan as a function including parameters derived from the previous data and a random variable.

The method may further include identifying a value of the right at each one of the plurality of respective times. More particularly, the method may further include identifying a plurality of values of the right at the plurality of respective times for each one of the plurality of scenarios.

Determining may include determining the present value of the right in response to the plurality of values of the right at the plurality of respective times for the plurality of scenarios.

Determining may include, at least for non-zero values of the plurality of values of the right at the plurality of respective times for the plurality of scenarios, generating a plurality of corresponding discounted present values. In such an embodiment, determining may then include determining the present value of the right as an average of the discounted present values.

Determining may include determining the present value of the right in respect of a mortgage secured by realty.

In accordance with another aspect of the invention, there is provided a computer-readable medium storing instruction codes for directing a processor circuit to determine, in respect of a loan secured by an asset, a present value of a right of a borrower of the loan to choose during a term of the loan to require an entity to pay the loan in full on the borrower's behalf in exchange for the asset, in response to at least one prediction of whether the borrower will exercise the right.

In accordance with another aspect of the invention, there is provided a signal embodied in a transmission medium. The signal includes instruction codes for directing a processor circuit to determine, in respect of a loan secured by an asset, a present value of a right of a borrower of the loan to choose during a term of the loan to require an entity to pay the loan in full on the borrower's behalf in exchange for the asset, in response to at least one prediction of whether the borrower will exercise the right. The transmission medium may include a tangible medium, such as a conductive wire for the propagation of electrical signals, or optical fiber for the propagation of electromagnetic signals, for example. Alternatively, the signal may be embodied in a carrier wave, such as a wireless electromagnetic signal, for example.

More generally, the instruction codes stored in such a computer-readable medium or included in such a signal may direct the processor circuit to cause any of the methods described herein to be carried out.

In accordance with another aspect of the invention, there is provided an apparatus including a processor circuit. The processor circuit is configured to determine, in respect of a loan secured by an asset, a present value of a right of a borrower of the loan to choose during a term of the loan to require an entity to pay the loan in full on the borrower's behalf in exchange for the asset, in response to at least one prediction of whether the borrower will exercise the right.

More generally, the processor circuit may be configured to cause the various methods described herein to be carried out.

In accordance with another aspect of the invention, there is provided an apparatus including means for generating at least one prediction of whether a borrower of a loan secured by an asset will exercise a right to choose during a term of the loan to require an entity to pay the loan in full on the borrower's behalf in exchange for the asset. The apparatus further includes means for determining a present value of the right, in response to the at least one prediction. The apparatus may further include means for causing the various functions described herein to be carried out.

It will be appreciated that such embodiments provide numerous useful results in relation to trade, commerce and industry. In addition to the benefits flowing to consumers and lenders, an entirely new industry associated with the selling of rights as described herein may be created, thereby opening an entirely new field of economic endeavor and productivity.

Other aspects and features of the present invention will become apparent to those ordinarily skilled in the art upon review of the following description of specific embodiments of the invention in conjunction with the accompanying figures.

BRIEF DESCRIPTION OF DRAWINGS

In drawings which illustrate embodiments of the invention,

FIG. 3 is a screen display depicting various fields displayed to a user of the apparatus shown in FIG. 1 in connection with execution of the valuation routine shown in FIGS. 2A and 2B;

DETAILED DESCRIPTION OF ILLUSTRATIVE EMBODIMENTS

Figure 1:
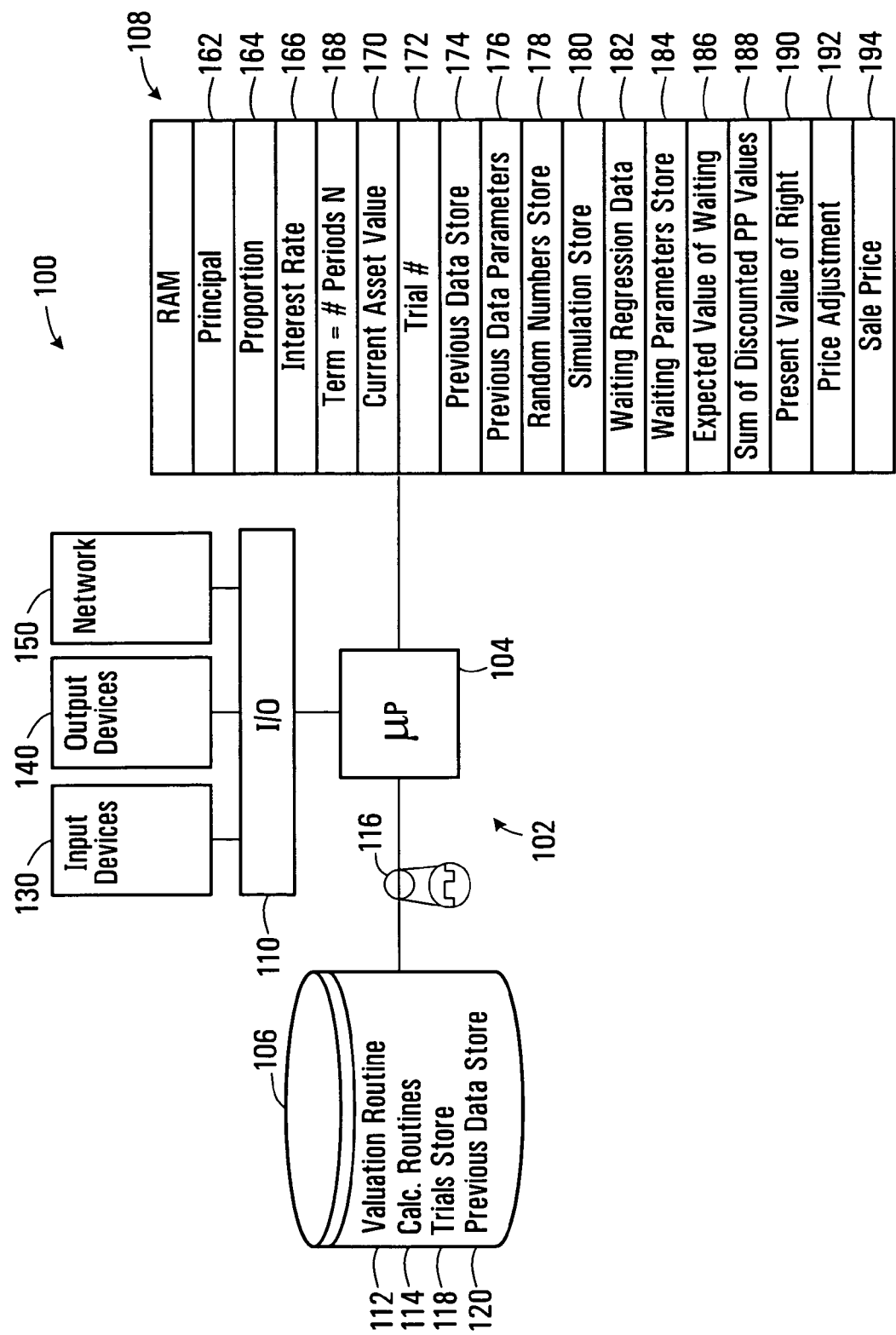
FIG. 1 is a block diagram of an apparatus according to an illustrative embodiment of the invention.

In accordance with one illustrative embodiment, a method includes granting, to a borrower of a loan secured by an asset, a right to choose during a term of the loan to require an entity to: (i) pay the loan in full on behalf of the borrower, and (ii) receive the asset in full satisfaction therefore. The method further includes receiving valuable consideration from the borrower in exchange for the granting of the right.

In this embodiment, the asset includes realty and the loan includes a mortgage secured by the realty. Alternatively, however, other forms of assets and corresponding asset-secured loans may be substituted. For example, the asset may alternatively include a chattel and the loan may include a chattel mortgage secured by the chattel. Alternatively, the asset may include other types of assets, such as stocks, bonds, debentures, mutual fund units, intellectual property rights, choses in action or combinations thereof, to name but a few examples. More generally, such a method may be applied to any asset-secured loan.

In the present embodiment, the entity is a different entity than a mortgagee of the mortgage (although in alternative embodiments, the entity may be the mortgagee). More particularly, in this embodiment the entity is a vendor of a new and useful financial instrument, and the method is carried out by the entity by entering into a contractual relationship with the borrower, through which the financial instrument is effectively provided to the borrower. In the present embodiment, the method includes manipulation of a tangible medium. More particularly, in this embodiment the method includes execution of a contract in paper form between the borrower and the entity. Alternatively, the method may include execution of a contract in electronic form stored in a computer-readable medium in jurisdictions that permit such contracts to be formed in such a manner.

In this embodiment, the above method grants to the borrower a right to choose to require the entity to repay the loan and receive the asset in exchange. Thus, in the present embodiment, the borrower's right is independent of the occurrence of any predefined event. Accordingly, in this embodiment the borrower may choose to exercise the right at any time, rather than being restricted to exercising the right only upon the occurrence of a pre-defined event such as involuntary loss of employment or injury.

In the present embodiment, in response to exercise of the right by the borrower, the entity pays the loan in full to the lender on behalf of the borrower. In this embodiment, such payment in full includes not only the total outstanding principal balance of the loan at the time that the borrower exercises the right, but also any penalties or premiums that may apply for early pre-payment of the loan prior to the expiry of the term of the loan, pursuant to the terms of the loan agreement between the borrower and the lender.

Also in this embodiment, in response to exercise of the right by the borrower, the entity receives the asset in full satisfaction for having paid the loan in full on the borrower's behalf. Thus, in the present embodiment, there is no further obligation of the borrower to either the lender or the entity, regardless of whether a value of the asset is less than an amount paid by the entity to the lender to pay the loan in full. If the borrower exercises the right, then the entity pays the loan in full to the lender, including any penalties or premiums for early pre-payment pursuant to the terms of the loan. The lender will therefore have been paid in full, thereby obviating the need for the lender to take any action adverse to the borrower. In exchange for paying the loan in full on the borrower's behalf, the entity receives the asset in exchange. If the proceeds of sale of the asset are less than the balance owing on the loan, which the entity had to pay to the lender, the entity absorbs the loss or shortfall.

In this embodiment, the valuable consideration that the entity receives from the borrower in exchange for the granting of the right includes money. More particularly, in this embodiment the valuable consideration includes a lump sum of money paid by the borrower to the entity at the commencement of the existence of the borrower's right to choose. Alternatively, however, the valuable consideration flowing from the borrower to the entity may include a plurality of payments over an extended period, such as periodic payments over the full term or over a portion of the term of the loan. More generally, other forms of valuable consideration may be substituted, and may be transferred from the borrower to the entity at one or more other times. In this embodiment, the entity sells such rights to a plurality of borrowers for profit, such that the valuable consideration received by the entity from all such borrowers significantly exceeds the entity's expenses or losses in the relatively small percentage of cases in which such rights will actually be exercised by the borrower.

In this embodiment, receiving the asset includes receiving a transfer of ownership of the asset from the borrower. More particularly, in this embodiment the entity receives the asset by receiving clear title to the asset from the borrower, unencumbered except by the loan itself which the entity is required to pay in full on the borrower's behalf. Alternatively, if desired, the entity and the borrower may agree from the outset that the entity will receive the asset with an agreed encumbrance, such as a pre-existing easement or right-of-way, for example.

Alternatively, however, receiving the asset may include receiving proceeds of a sale of the asset. Thus, if desired, the entity and the borrower may agree from the outset that in the event of exercise of the right by the borrower, the borrower will be required to sell the asset and give the proceeds of the sale of the asset to the entity. Such a sale may be governed by express contractual obligations under the terms of the agreement between the entity and the borrower, such as an obligation of good faith, an obligation to have the sale handled by a licensed broker obligated to deal with the highest bidder, or other conditions or obligations.

As noted earlier here, as the method and the corresponding right to choose described above are new, valuation methods have not previously existed for determining the appropriate amount of valuable consideration for the entity to require from the borrower, in order to profit from the sale of such rights.

Therefore, referring to FIG. 1, an apparatus according to another illustrative embodiment is shown generally at 100. In this embodiment, the apparatus 100 includes a processor circuit 102. In the present embodiment, the processor circuit 102 is configured to determine, in respect of a loan secured by an asset, a present value of a right of a borrower of the loan to choose during a term of the loan to require an entity to pay the loan in full on the borrower's behalf in exchange for the asset, in response to at least one prediction of whether the borrower will exercise the right.

More particularly, in this embodiment the processor circuit 102 includes a microprocessor 104 in communication with a storage medium 106, a memory 108 and an input/output (I/O) interface 110. More generally, however, in this specification, the term "processor circuit" is intended to broadly encompass any type of device or combination of devices capable of performing the functions described herein, including (without limitation) other types of microprocessors, microcontrollers, other integrated circuits, other types of circuits or combinations of circuits, logic gates or gate arrays, or programmable devices of any sort, for example, either alone or in combination with other such devices located at the same location or remotely from each other, for example. Additional types of processor circuits will be apparent to those ordinarily skilled in the art upon review of this specification, and substitution of any such other types of processor circuits is considered not to depart from the scope of the present invention as defined by the claims appended hereto.

In this embodiment, the storage medium 106 includes a hard disk drive. In the present embodiment, the storage medium 106 stores various routines, which configure or program the microprocessor 104 to cause the various valuation methods herein to be carried out. More particularly, in this embodiment the storage medium 106 stores a valuation routine 112 and a plurality of calculation routines shown generally at 114. In this embodiment, the calculation routines 114 include commercially available calculation tools, including MATLAB™ and SAS™ routines, as well as EXCEL™. Alternatively, if desired, the calculation routines may be omitted, and the desired calculation functionality may be included directly in the novel valuation routine 112. In this embodiment, the storage medium 106, or more particularly the hard disk drive, acts as a computer-readable medium storing instruction codes for directing the processor circuit 102 to carry out the various functions described below. Alternatively, however, other types of computer-readable media may be substituted. It will be appreciated that the storage medium 106 is merely one example of a computer-readable medium for generating a signal embodied in a transmission medium, such as that shown at 116, for directing the processor circuit 102 to carry out the various functions described below. Alternatively, other ways of generating such signals may be substituted. Likewise, if desired, such signals may be embodied in a carrier wave, such as a wireless electromagnetic signal for example.

In this embodiment, the storage medium 106 also stores various types of data output by or used by the processor circuit 102 under the direction of the valuation routine 112. More particularly, in this embodiment the storage medium 106 includes a trials store 118 for storing information generated by the processor circuit 102 under the direction of the valuation routine 112, and a previous data store 120 for storing data representing previous values of similar types of assets and previous interest rates, for use by the processor circuit 102 in the execution of the valuation routine 112, as discussed in greater detail below.

In this embodiment, the processor circuit 102 is in communication, via the I/O interface 110, with a plurality of other devices. More particularly, in this embodiment the processor circuit 102 is in communication with a plurality of input devices 130, a plurality of output devices 140 and a network 150. More particularly still, in this embodiment the input devices 130 include a keyboard and a mouse, and may further include a removable media device, such as a compact disc drive, for example. In the present embodiment, the output devices 140 include a display monitor and a printer, and may also include one or more removable media devices. In this embodiment, the network 150 includes a local area network, which in turn is in communication with the public Internet.

In this embodiment, the memory 108 includes a random access memory (RAM), although alternatively, other types of memory devices may be substituted.

In the present embodiment, the valuation routine 112 directs the processor circuit 102 to define, in the memory 108, a plurality of registers and stores, including: a principal register 162, a proportion register 164, an interest rate register 166, a term register 168, a current asset value register 170, a trial number register 172, a previous data store 174, a previous data parameters store 176, a random numbers store 178, a simulation store 180, a waiting regression data store 182, a waiting parameters store 184, an expected value of waiting register 186, a sum of discounted present values register 188, a present value of right register 190, a price adjustment register 192 and a sale price register 194. The various registers and stores are discussed in greater detail below, in connection with the valuation routine 112.

Valuation Routine

Figure 2A:
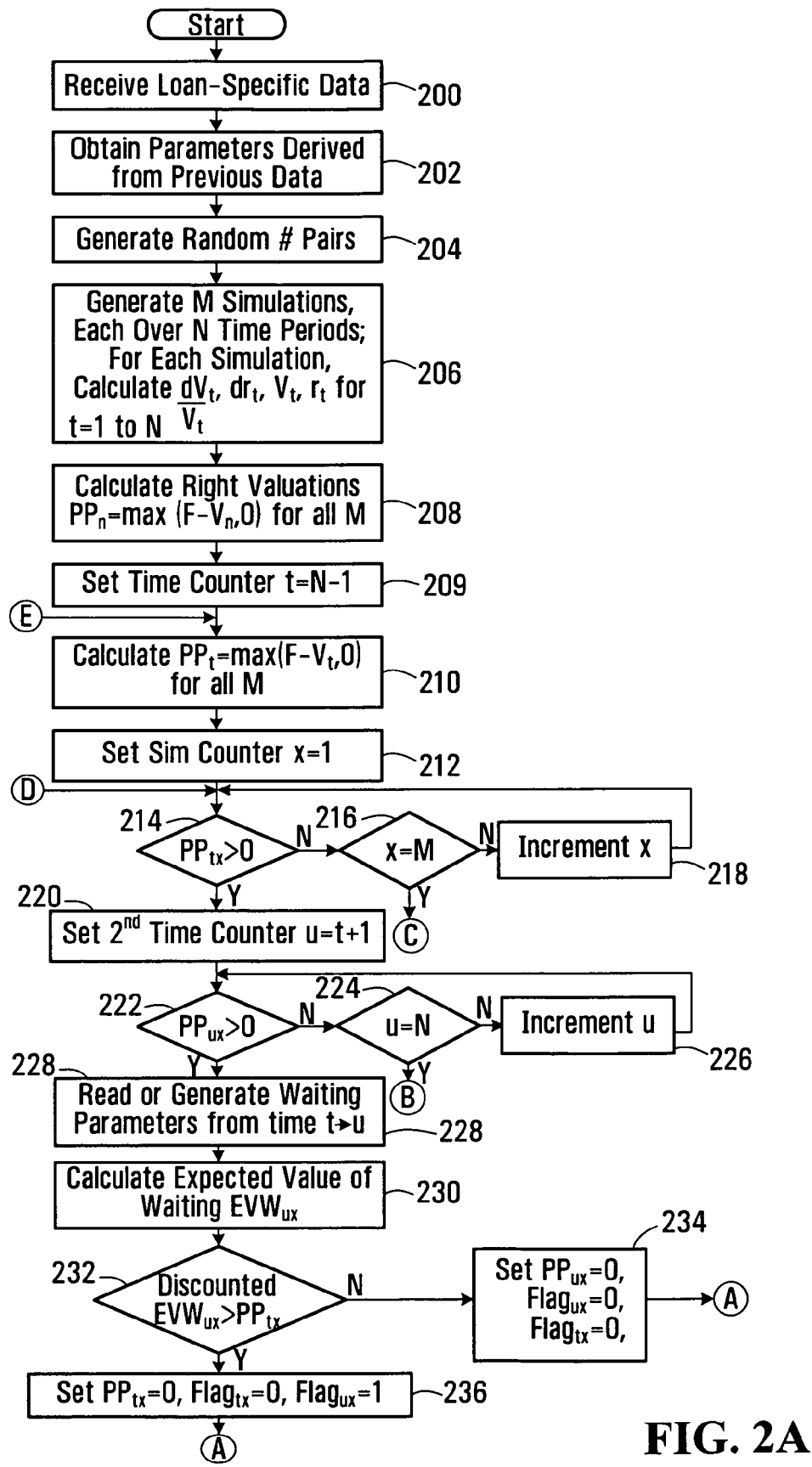
FIGS. 2A and 2B are a flowchart of a valuation routine executed by a processor circuit of the apparatus shown in FIG. 1.
Figure 2B:
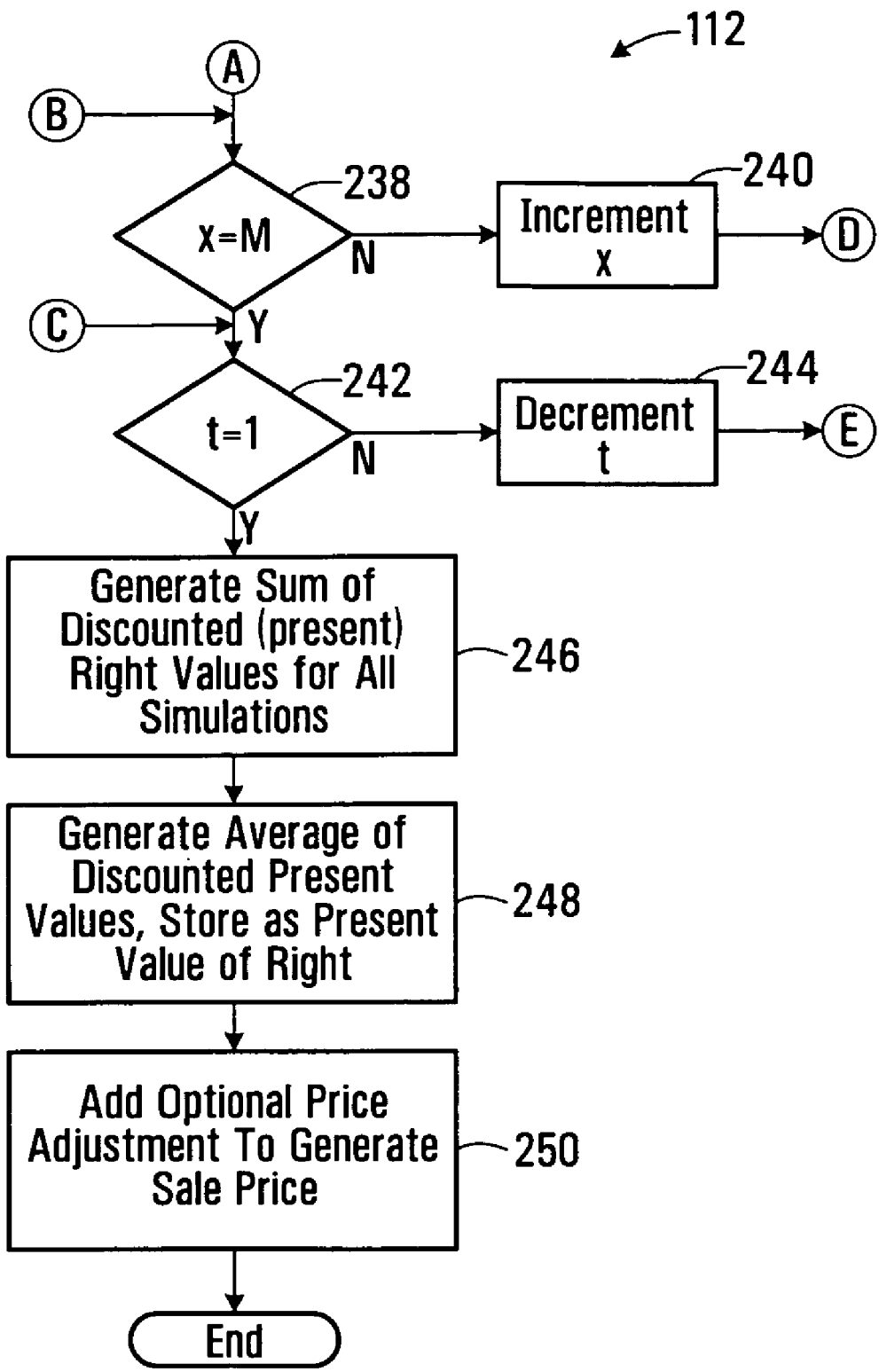

Referring to FIGS. 1, 2A, 2B and 3, the valuation routine is shown generally at 112 in FIGS. 2A and 2B. Generally, in this embodiment the valuation routine 112 directs the processor circuit 102 to implement a method including determining, in respect of a loan secured by an asset, a present value of a right of a borrower of the loan to choose during a term of the loan to require an entity to pay the loan in full on the borrower's behalf in exchange for the asset, in response to at least one prediction of whether the borrower will exercise the right.

In this embodiment, the valuation routine 112 directs the processor circuit 102 to generate the at least one prediction. More particularly, in this embodiment the processor circuit 102 is directed to generate the at least one prediction in response to a present value of the asset and an interest rate of the loan.

More particularly still, in this embodiment the valuation routine 112 begins with a first block 200 of instruction codes, which directs the processor circuit 102 to control a display monitor (not shown) to display a graphical user interface (GUI) window shown generally at 300 in FIG. 3. In this embodiment, the GUI window 300 prompts a user of the apparatus 100 to enter information in a plurality of displayed fields, including a principal field 302, a proportion field 304, an interest rate field 306, a term field 308, an asset current value field 310, and a price adjustment field 316. More particularly, in this embodiment the user is prompted to enter the principal balance of the loan into the principal field 302. The proportion field 304 stores a multiplier by which the contents of the principal field 302 are multiplied, strictly for the convenience of the user: the contents of the proportion field 304 are set to 1.0 by default, but the user can change the contents of this field to easily see how a percentage change in the principal balance will affect the present value of the right of the borrower, and the corresponding sale price for the right (for example, entering 0.9 will enable the user to calculate a revised present value of the right if the borrower decides to borrow 10% less under the loan). The user is prompted to enter the interest rate of the loan into the interest rate field 306, and the term in months of the loan (e.g. "24" for a two-year mortgage) into the term field 308. Finally, the user is prompted to enter the current value of the asset into the asset current value field 310. For example, if the asset is a residential home being purchased at the time of commencement of the loan, the purchase price may be entered as a reasonable estimate of the market value of the asset. Alternatively, in the case of a mortgage or loan renewal, where the borrower has already previously purchased the home at some time in the past, an appraised value of the home or a tax-assessment value of the home may be entered. In the price adjustment field 316, the user is prompted to enter a price adjustment, to be added to the calculated present value of the borrower's right to choose to require the entity to pay the loan in full in exchange for the asset. Such a price adjustment may be used to add overhead costs and a profit margin to the calculated present value of the right, to arrive at a satisfactory sale price for the right. Alternatively, if desired, the price adjustment may be a multiplier rather than an addition, to effectively mark up the present value of the right by a fixed percentage to arrive at the sale price for the right. As a further alternative, the price adjustment may include two fields, one for a base fee to be added to the present value and another to be multiplied by it to arrive at the final sale price. Or, as a further alternative, the price adjustment and sale price fields may be omitted entirely, and the user may simply use the present value of the right as calculated below as a basis for performing further independent calculations to arrive at a sale price for the right. In this embodiment, upon entry of the contents of the fields 302, 304, 306, 308, 310 and 316, block 200 directs the processor circuit 102 to store the contents of these fields in their respective corresponding registers 162, 164, 166, 168, 170 and 192 in the memory 108.

Also in this embodiment, the GUI window 300 includes a trial number field 312, which stores a counter to identify the valuation in question. Block 200 directs the processor circuit 102 to automatically generate an incremented counter value each time the valuation routine 112 is executed, and to store the counter value in the trial number register 172 in the memory 108.

In the present embodiment, the GUI window 300 further includes a present value of right field 314, for displaying the present value of the right of the borrower to choose to require the entity to pay the loan in full in exchange for the asset, as calculated below. Similarly, in this embodiment the GUI window 300 includes a sale price field 318, for displaying a sale price for the right, reflecting both the calculated present value of the right and the price adjustment, as discussed above.

In this embodiment, the GUI window 300 further includes fields shown generally at 330 for displaying interest rate parameters, and fields shown generally at 340 for displaying asset value parameters, used by the processor circuit 102 in executing the remainder of the valuation routine 112, as discussed in greater detail below. Such parameters may be of interest to more sophisticated users of the apparatus, 100. Alternatively, these fields may be omitted from the GUI window 300 if desired.

Following execution of block 200, the processor circuit 102 is then generally directed to generate a plurality of predictions whether the borrower will exercise the right at a plurality of respective times during the term of the loan. More particularly, in this embodiment the processor circuit is directed to simulate a plurality of scenarios, each scenario reflecting possible changes in value of the asset and in interest rates over the term of the loan. The processor circuit is then directed to generate the plurality of predictions whether the borrower will exercise the right at the plurality of respective times, for each one of the plurality of scenarios.

In this embodiment, simulating includes simulating at least $2 \times 10^4$ scenarios. More particularly, in this embodiment simulating includes simulating $1 \times 10^5$ scenarios. Alternatively, other numbers of scenarios may be simulated, depending upon available processing power and required reliability.

Figure 4:
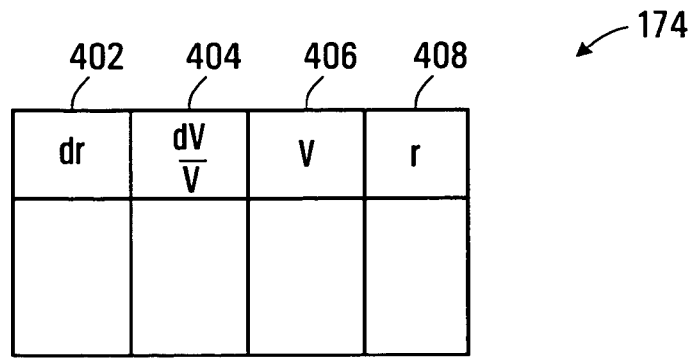
FIG. 4 is a tabular representation of a configuration of a previous data store of the apparatus shown in FIG. 1.

Referring to FIGS. 1, 2A, 4 and 5, in this embodiment, the plurality of scenarios are simulated in response to previous data representing previous changes in values of similar types of assets and previous changes in interest rates. To achieve this in the present embodiment, block 202 directs the processor circuit 102 to obtain parameters derived from the previous data. More particularly, in this embodiment block 202 directs the processor circuit 102 to copy the contents of the previous data store 120 in the storage medium 106 to the previous data store 174 in the memory 108. As shown in FIG. 4, in this embodiment the contents of the previous data store 174 include an interest rate change field 402, a proportional asset value change field 404, an asset value field 406 and an interest rate field 408, stored in a tab-delimited data file format, the first row of which contains the corresponding tab-delimited headings: "dr dV/V v r". More particularly still, in the present embodiment, in which the asset is realty, the asset value field 406 stores a plurality of values V at respective times of a real estate index for the local geographic market in which the asset is located. The proportional asset value change field 404 stores a plurality of corresponding proportional changes dV/V in the real estate index. In this embodiment, it is contemplated that the user of the apparatus 100 will maintain and update the contents of the previous data store 120, to maintain accurate data reflecting changes in real estate values and interest rates in the user's local geographic market. Alternatively, however, if desired, block 202 may be modified to direct the processor circuit 102 to obtain such previous data from a remote server via the network 150, or may be modified to prompt a user of the apparatus 100 to enter the previous data or a location of a data file in which it is stored.

In this embodiment, block 202 then directs the processor circuit 102 to obtain the parameters derived from the previous data. In this regard, in the present embodiment, the following relationships are used to model the proportional change dV/V in the real estate index value V and the change dr in the prevailing interest rate r:

$$\frac{\partial V}{V} = (a_{v1} + a_{v2}V + a_{v3}r)\partial t + \sigma_v \partial z_v \qquad (1)$$

and $$\partial r = (a_{r1} + a_{r2}r)\partial t + \sigma_r \partial z_r \qquad (2)$$

wherein:
V is the real estate index, and dV/V is the proportional change therein;
r is the interest rate, and dr is the change therein;
dt is the time increment, in this embodiment one month measured in units of years, i.e. dt=$1/12$;
$a_{v1}$, $a_{v2}$, $a_{v3}$, $a_{r1}$, $a_{r2}$, are modeling parameters calculated below;
$\sigma_v$ and $\sigma_r$ are the standard errors or volatilities in the real estate index V and interest rate r, respectively; and
$dz_v = \epsilon_v \sqrt{dt}$, wherein $\epsilon_v$ is a random number, and the square root of the time increment $\sqrt{dt}$ serves to effectively express the standard error $\sigma_v$ in annualized terms rather than monthly; and similarly,
$dz_r = \epsilon_r \sqrt{dt}$, wherein $\epsilon_r$ is a random number, and the square root of the time increment $\sqrt{dt}$ serves to effectively express the standard error $\sigma_r$ in annualized terms rather than monthly.

Thus, in this embodiment the possible changes in value of the asset over the term of the loan are modeled as a function including parameters $a_{v1}$, $a_{v2}$ and $a_{v3}$ derived from the previous data and a random variable $\epsilon_v$. Similarly, in this embodiment the possible changes in interest rates over the term of the loan are modeled as a function including parameters $a_{r1}$ and $a_{r2}$ derived from the previous data and a random variable $\epsilon_r$.

Figure 5:
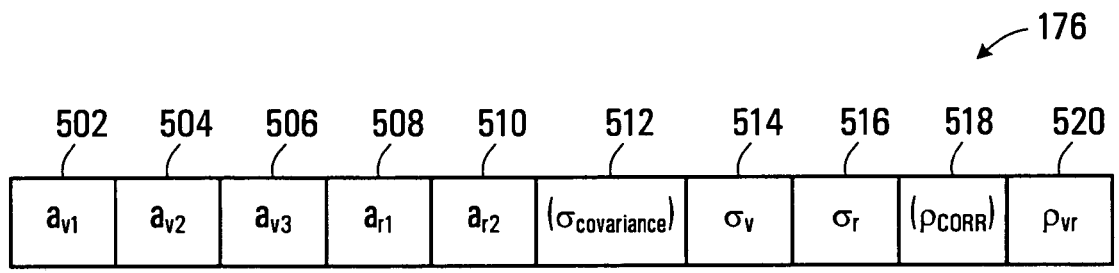
FIG. 5 is a tabular representation of a configuration of a previous data parameters store of the apparatus shown in FIG. 1.

In this embodiment, block 202 directs the processor circuit 102 to execute one of the calculation routines 114 to generate the parameters derived from the previous data. More particularly, in this embodiment block 202 directs the processor circuit to execute the SAS™ routine, and to execute the following routine in SAS™ to derive the parameters from the contents of the previous data store 120 (or 174):

proc sysnlin data=datafile itsur covs corrs;
        var dr dVV v r;
        parms av1 av2 av3 ar1 ar2;
        dVV=av1+av2*lag1(r)+av3*lag1(v);
        dr=ar1+ar2*lag1(r);
    run;

wherein "datafile" is the name of the tab-delimited data file storing the previous data from the previous data store 120 and its heading as described above. Executing this procedure returns all five parameters $a_{v1}$, $a_{v2}$, $a_{v3}$, $a_{r1}$, $a_{r2}$, a covariance matrix including the standard error terms $\sigma_v$ and $\sigma_r$, and a correlation matrix including a correlation $\rho_{vr}$ between the errors for the proportional asset value changes dV/V and the interest rate changes dr contained in the previous data store 174 (or 120). Block 202 directs the processor circuit to store these parameters and matrices in the previous data parameters store 176 in the memory 108. More particularly, referring to FIGS. 2A and 5, block 202 directs the processor circuit 102 to store the five parameters $a_{v1}$, $a_{v2}$, $a_{v3}$, $a_{r1}$, $a_{r2}$ in corresponding respective fields 502, 504, 506, 508 and 510 of the previous data parameters store 176, while the covariance matrix and the standard errors av and ar are stored in corresponding respective fields 512, 514 and 516 of the previous data parameters store 176, and the correlation matrix and the correlation $\rho_{vr}$ extracted therefrom are stored in respective fields 518 and 520 of the previous data parameters store 176. Referring to FIGS. 3 and 5, block 202 also directs the processor circuit 102 to display the parameters and standard errors in the relevant interest rate parameter fields 330 and asset value parameter fields 340 of the GUI window 300.

Alternatively, however, if desired, block 202 may be modified to direct the processor circuit 102 to obtain the various desired parameters from a remote server via the network 150, rather than calculating the parameters from the previous data. Or, as a further alternative, default parameters derived from previous data may be stored as a data block within the valuation routine 112 itself (if desired, a plurality of sets of such default parameters may be stored, one set for each major city or other geographic region). As another illustrative alternative, one or more of the parameters may be calculated in different ways. For example, if desired, the correlation $\rho_{vr}$ may alternatively be identified by applying the CORREL function in EXCEL™ to the values dV/V and dr stored in the previous data store 174:

$$\rho_{vr} = CORREL\left(\frac{\partial V}{V}, \partial r\right) \quad (3)$$

More generally, other suitable ways of obtaining the desired parameters may be substituted.

Referring to FIGS. 1 and 2A, in this embodiment, block 204 then directs the processor circuit 102 to generate a plurality of random numbers for use in the simulations. More particularly, in this embodiment block 204 directs the processor circuit to generate M×N pairs of random numbers ($\epsilon_v$, $\epsilon_r$), wherein M is the number of scenarios to be simulated, and N is the number of time periods of the loan (in this embodiment, M=100,000 and N=the contents of the term register 168, such as "24" months to indicate a two-year term, for example). Thus, a random number $\epsilon_v$ and a random number $\epsilon_r$ are generated for each time-step for each simulated scenario. More particularly, in this embodiment the random numbers ($\epsilon_v$, $\epsilon_r$) are correlated. To achieve this, block 204 directs the processor circuit 102 to identify a correlation between the proportional asset value changes dV/V and the interest rate changes dr contained in the previous data store 174 (or 120). More particularly, in this embodiment block 204 directs the processor circuit to identify the correlation by reading the correlation $\rho_{vr}$ stored in the correlation field 520 of the previous data parameters store 176, as discussed above in greater detail in connection with block 202.

In this embodiment, block 204 then directs the processor circuit 102 to invoke another one of the calculation routines 114, in this case MATLAB™, to generate a matrix containing the correlated random numbers selected from a multivariate normal distribution, using the MVNRND statistics tool. Block 204 directs the processor circuit 102 to execute a MATLAB™ command of the form R=mvnrnd($\mu$,$\sigma$), where $\mu$ is the mean (in this case a zero matrix) and $\sigma$ is the covariance:

$$\mu = \begin{pmatrix} 0 \\ 0 \end{pmatrix} \quad (4)$$

and $$\sigma = \begin{pmatrix} \sigma_v & \rho_{vr}\sigma_v\sigma_r \\ \rho_{vr}\sigma_v\sigma_r & \sigma_r \end{pmatrix} \quad (5)$$

where $\rho_{vr}$, $\sigma_v$ and $\sigma_r$ are the correlation and standard errors that were produced and stored in their respective fields 520, 514 and 516 of the previous data parameters store 176, as discussed above at block 202.

Block 204 directs the processor circuit 102 to store the resulting pairs of correlated random numbers ($\epsilon_v$, $\epsilon_r$) in the random numbers store 178.

Figure 6:
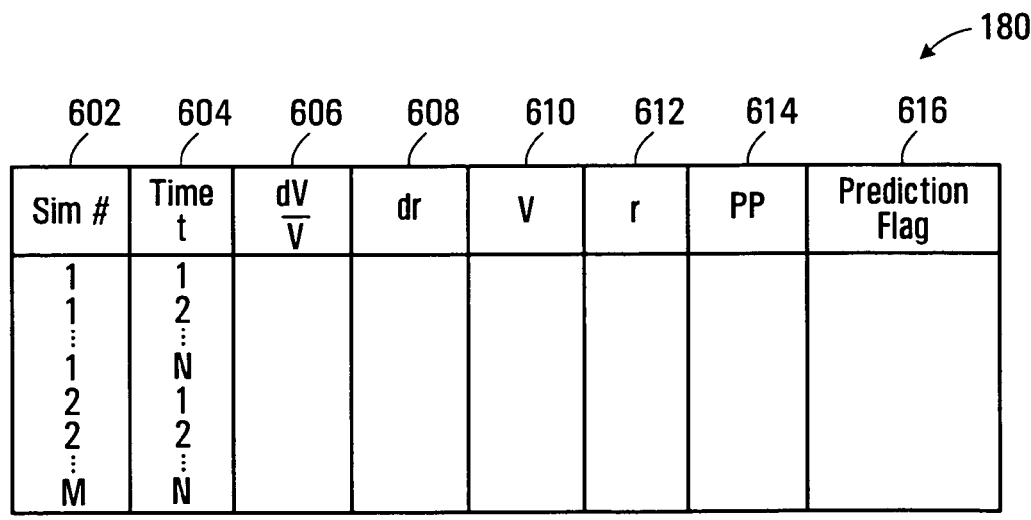
FIG. 6 is a tabular representation of a configuration of a simulation store of the apparatus shown in FIG. 1.

Referring to FIGS. 1, 2A and 6, in this embodiment, block 206 then directs the processor circuit 102 to simulate a plurality of scenarios, each scenario reflecting possible changes in value of the asset and in interest rates over the term of the loan. More particularly, in this embodiment block 206 directs the processor circuit to generate $10^5$ such scenarios, although alternatively, a more general number M of simulated scenarios may be substituted. As shown in FIG. 6, in this embodiment block 206 directs the processor circuit 102 to generate and store a plurality of corresponding simulation records in the simulation store 180, one such record for each incremental time period within each simulated scenario. Each such record includes a simulation number field 602 for storing a number identifying the simulation number to which the record relates (in this embodiment, a number between 1 and 100,000), and a time field 604 for storing a number identifying the specific time period within the simulated scenario to which the record relates (e.g., for a loan with a 24-month term, this number ranges from 1 to 24). Each such record for each respective time period within a simulation further includes a proportional asset value change field 606 for storing a predicted proportional change in the value of the asset, an interest rate change field 608 for storing a predicted change in the prevailing interest rate, a predicted asset value field 610 for storing a predicted value of the asset, an interest rate field 612 for storing a predicted interest rate, a right valuation field 614 for storing a predicted value at that time period of the borrower's right to choose to require the entity to repay the loan in exchange for the asset, and a prediction flag field 616 for storing a binary flag to serve as a prediction whether the borrower will exercise the right at that time period.

In this embodiment, to generate each such simulated scenario, block 206 directs the processor circuit 102 to set an initial value $V_0$ of the asset at time t=0 equal to the contents of the current asset value register 170, and to set an initial value $r_0$ of the interest rate equal to the contents of the interest rate register 166. Block 206 then directs the processor circuit 102 to iteratively predict a change in the value of the asset and a change in the prevailing interest rate, for each of the N incremental time periods of the term of the loan (it will be recalled that in this embodiment, each incremental time period is one month, and the number N of months of the term of the loan is stored in the term register 168; for example, N=24 for a two-year mortgage). To achieve this, for the first iteration of the first simulated scenario, block 206 first directs the processor circuit 102 to select a first pair of the correlated random numbers ($\epsilon_{v1}$, $\epsilon_{r1}$) stored in the random numbers store 178. Block 206 then directs the processor circuit to calculate a first asset value proportional change dV/V and a first interest rate change dr using the initial values $V_0$ and $r_0$ (from the current asset value register 170 and the interest rate register 166, respectively), the five parameters $a_{v1}$, $a_{v2}$, $a_{v3}$, $a_{r1}$, $a_{r2}$ and the standard errors $\sigma_v$ and $\sigma_r$ stored in the previous data parameters store 176, and the selected pair of random numbers ($\epsilon_{v1}$, $\epsilon_{r1}$), as follows:

$$\frac{\partial V_0}{V_0} = (a_{v1} + a_{v2}V_0 + a_{v3}r_0)\partial t + \sigma_v \epsilon_{v1}\sqrt{\partial t} \tag{6}$$

and $$\partial r_0 = (a_{r1} + a_{r2}r_0)\partial t + \sigma_r \epsilon_{r1}\sqrt{\partial t} \tag{7}$$

wherein the time increment dt=1/12 (one month expressed in annual terms).

Block 206 then directs the processor circuit 102 to use the above change values to calculate a predicted asset value and a predicted interest rate for the next successive time period, which in the case of the first iteration are:

$$V_1 = V_0\left(1 + \frac{\partial V_0}{V_0}\right) \tag{8}$$

and $$r_1 = r_0 + \partial r_0 \tag{9}$$

Block 206 then directs the processor circuit 102 to store the values $V_1$, $r_1$, $dV_0/V_0$ and $dr_0$ in the appropriate fields 610, 612, 606 and 608 of the record in the simulation store 180 corresponding to the first time period t=1 of the first simulation.

In this embodiment, block 206 then directs the processor circuit 102 to repeat the above iterations, with each iteration selecting a next successive pair of random numbers ($\epsilon_v$, $\epsilon_r$). In other words, for the $n^{th}$ iteration of the first simulation, $$\frac{\partial V_{n-1}}{V_{n-1}} = (a_{v1} + a_{v2}V_{n-1} + a_{v3}r_{n-1})\partial t + \sigma_v \epsilon_{vn}\sqrt{\partial t} \tag{10}$$

$$\partial r_{n-1} = (a_{r1} + a_{r2}r_{n-1})\partial t + \sigma_r \epsilon_{rn}\sqrt{\partial t} \tag{11}$$

$$V_n = V_{n-1}\left(1 + \frac{\partial V_{n-1}}{V_{n-1}}\right) \tag{12}$$

$$r_n = r_{n-1} + \partial r_{n-1} \tag{13}$$

Block 206 directs the processor circuit 102 to repeat these iterations and generate corresponding records for the first simulated scenario, until such records have been created for all time increments of the first simulated scenario (e.g., for n=1 to 24 for a loan having a 24-month term).

Block 206 then directs the processor circuit 102 to repeat the above procedures to generate a plurality of such simulated scenarios. In this embodiment, 100,000 such simulated scenarios are generated, although alternatively, other numbers may be substituted. Each such simulated scenario uses its own unique set of successive values of the correlated random number pairs ($\epsilon_v$, $\epsilon_r$) stored in the random numbers store 178, rather than re-using the same set as the previous simulated scenario. Thus, each simulated scenario represents a unique randomized trajectory of the possible changes in the value of the asset and a similarly unique randomized trajectory of the possible changes in interest rates, although both such randomized trajectories are based on parameters derived from previous data representing previous changes in values of similar types of assets and previous changes in interest rates.

Still referring to FIGS. 1, 2A and 6, in this embodiment, block 208 then directs the processor circuit 102 to calculate a predicted exercise value of the right of the borrower to choose to require the entity to repay the loan in exchange for the asset, at the end of the term of the loan, i.e. at time t=N=the contents of the term register 168 (e.g. t=24 in the case of a loan with a 24-month term). More particularly, in this embodiment the processor circuit is directed to generate such a predicted exercise value $PP_N$ at time t=N for each one of the M simulations (in this embodiment 100,000 simulations), as follows:

$$PP_N = \text{MAX}(F_N - V_N, 0) \tag{14}$$

wherein $V_N$ is the contents of the predicted asset value field 610 for time t=N, and $F_N$ is the face value of the loan, i.e. the outstanding principal of the loan at time t=N. In this embodiment, for ease of illustration, it is assumed that the loan is a non-amortizing loan, so that $F_N$ is a constant, i.e., $F_N$=F=the contents of the principal register 162. Alternatively, however, if desired, the valuation routine 112 and the simulation store 180 may be modified to account for amortizing loans, in which case each record in the simulation store 180 may include an additional field (not shown) for storing a value representing the outstanding principal $F_t$ at each time period increment t. Logically, if at time t=N, the outstanding principal F owing on the loan exceeds the value $V_N$ of the asset at that time, then the right has value to the borrower, as the borrower will derive a benefit in the amount of $(F-V_N)$ by exercising the right, because the borrower will have given to the entity an asset having a lower value $V_N$ than the amount of the loan F that the entity will have to pay if the right is exercised. Conversely, if the outstanding principal F owing on the loan is less than the value $V_N$ of the asset, then the right of the borrower to choose to require the entity to pay the loan in full in exchange for the asset has no value to the borrower. Although the above prediction of the value of the right takes into account only the principal owing and the value of the asset, alternatively, other factors may be included, such as a cost of moving, for example. Such costs can be incorporated by subtracting them from the value of the asset at that time in equation (14), for example.

Block 208 directs the processor circuit 102 to store such a predicted exercise value $PP_N$ in the right valuation field 614 of the record for time t=N for each one of the 100,000 simulated scenarios. Also in this embodiment, for each non-zero predicted exercise value $PP_N$, block 208 directs the processor circuit 102 to store a binary "1" in the prediction flag field 616 of the relevant record, as a tentative prediction that the borrower is likely to exercise the right at that time, because it has a positive value to the borrower.

Generally, in this embodiment blocks 209 to 250 direct the processor circuit 102 to determine a present value of the right of the borrower to choose during the term of the loan to require the entity to pay the loan in full in exchange for the asset, in response to at least one prediction of whether the borrower will exercise the right. More particularly, in this embodiment the present value of the right is determined in response to a plurality of predictions whether the borrower will exercise the right at a plurality of respective times during the term of the loan. More particularly, in this embodiment the processor circuit is directed to generate the plurality of predictions whether the borrower will exercise the right at the plurality of respective times, for each one of the plurality of scenarios. To generate such predictions, blocks 209-250, and in particular block 210, direct the processor circuit 102 to identify a value of the right at each one of the plurality of respective times during the term of the loan. More particularly, as discussed below, the repeated execution of block 210 directs the processor circuit to identify a plurality of values of the right at the plurality of respective times for each one of the plurality of simulated scenarios.

As discussed in greater detail below, beginning with time t=N-1, predicted exercise values $PP_{N-1}$ representing the value of exercising the right at time N-1 are generated for all of the simulated scenarios. If, for a given simulated scenario, the immediate value $PP_{N-1}$ of exercising the right at time t=N-1 is greater than an expected value of waiting until a subsequent time t=N to exercise the right, then it is predicted that the borrower will act rationally and exercise the right at time t=N-1; it is therefore concluded that the right will have no value at subsequent times and will not be exercised at subsequent times. Otherwise, if the immediate value $PP_{N-1}$ of exercising the right at time t=N-1 is not greater than an expected value of waiting until a subsequent time, it is predicted that the borrower will not exercise the right at time t=N-1. This procedure is then repeated for time t=N-2, so that if the immediate value $PP_{N-2}$ of exercising the right at time t=N-2 is greater than an expected value of waiting until a subsequent time t=N-1 or t=N to exercise the right, then it is predicted that the borrower will act rationally and exercise the right at time t=N-2; it is therefore concluded that the right will have no value at subsequent times and will not be exercised at subsequent times. This procedure is repeated for time t=N-3, t=N-4, t=N-5, . . . t=1. As a result, each simulated scenario will have either (a) one and only one time at which the borrower is predicted to exercise the right (as reflected by the prediction flag field 616 contents); or (b) no times at which the borrower is predicted to exercise the right, if the right is predicted to have no value throughout the scenario.

Referring to FIGS. 1, 2A and 6, to achieve this in the present embodiment, block 209 directs the processor circuit 102 to set a time counter t=N-1, where N is the number of time periods of the term of the loan, as stored in the term register 168.

Block 210 then directs the processor circuit 102 to calculate a predicted exercise value of the right of the borrower to choose to require the entity to repay the loan in exchange for the asset, at time t, for each one of the M simulations (in this embodiment 100,000 simulations), as follows:

$$PP_t = \text{MAX}(F_t - V_t, 0) \quad (15)$$

wherein $V_t$ is the contents of the predicted asset value field 610 for time t, and $F_t$ is the outstanding principal of the loan at time t (in this embodiment, in which a non-amortizing loan is assumed for ease of illustration, $F_t$=F=the contents of the principal register 162). Block 210 directs the processor circuit to store the resulting predicted exercise values in the corresponding right valuation fields 614 of the relevant simulation records for time t. Thus, on the first execution of block 210 (for time t=N-1), only the predicted exercise values $PP_{N-1}$ for time t=N-1 are generated and stored.

Generally, in this embodiment, blocks 214 to 244 direct the processor circuit 102 to identify all simulated scenarios having non-zero predicted exercise values $PP_t$ at the currently addressed time period t (commencing with time t=N-1 on the first collective execution of these blocks, and being repeated for successively earlier time periods thereafter). For each such simulated scenario having a non-zero predicted exercise value $PP_t$ at the currently addressed time period t, the processor circuit is directed to determine whether that simulated scenario has any non-zero predicted exercise value at any subsequent time in the term of the loan (for example, for each simulated scenario having non-zero right valuation field 614 contents at time t=N-1, the processor circuit is directed to determine whether the right valuation field 614 contents for time t=N are also non-zero for that simulated scenario). If so, then the processor circuit is directed to compare the immediate value of exercise of the right at time t (e.g. N-1) to an expected value of waiting until the subsequent time t+ . . . (e.g. N) to exercise the right. If the immediate value of exercise is greater than the expected value of waiting, then the contents of the right valuation field 614 and the prediction flag 616 at the subsequent time are reset to zero, as it predicted that the borrower will exercise the right at the currently addressed time. Conversely, if the immediate value of exercise is less than the expected value of waiting until the subsequent time, then the contents of the right valuation field 614 and the prediction flag 616 at the currently addressed time are reset to zero, as it is predicted that the borrower will wait until the subsequent time to exercise the right. Due to this resetting effect (discussed below at blocks 234 and 236), it will be appreciated that within each scenario, if the currently addressed time period has a non-zero predicted exercise value, then no more than one subsequent time period of that same scenario can have a non-zero predicted exercise value. Thus, for each currently addressed time period for each scenario, no more than one such comparison is performed.

To achieve this, in this embodiment, block 212 directs the processor circuit 102 to set a simulation counter x equal to 1.

Block 214 then directs the processor circuit 102 to address a simulated scenario record in the simulation store 180 having simulation number field 602 contents equal to the current value of the simulation counter x, and having time field 604 contents equal to the time counter t (e.g., the first time block 214 is executed, t=N−1 and x=1).

If the predicted exercise value stored in the right valuation field 614 of the currently addressed record is equal to zero, this particular simulated scenario may be ignored for the presently addressed time period t. Block 216 directs the processor circuit 102 to determine whether all of the simulated scenarios have been addressed, and if not, block 218 directs the processor circuit 102 to increment the simulation counter x. The processor circuit is then returned to block 214, to continue searching for a simulation scenario record having non-zero right valuation field 614 contents and time field 604 contents equal to the currently addressed time t.

Upon locating such a simulation scenario record having non-zero right valuation field 614 contents for the currently addressed time t, in the present embodiment, block 220 then directs the processor circuit to set a second time counter u=t+1. Block 222 then directs the processor circuit 102 to determine whether the right valuation field 614 contents for the currently addressed simulation x for the next time period u are also non-zero. (For example, on the first collective execution of blocks 214-244 for which t=N−1, if a given simulation has a non-zero predicted exercise value at time t=N−1, the processor circuit is directed to determine whether that simulation also has a non-zero predicted exercise value at time u=t+1=N). If the right valuation field 614 contents are zero for the next time period u, blocks 224 and 226 effectively direct the processor circuit to continue incrementing u and to continue searching for any simulation records for the currently addressed simulation x having non-zero right valuation field 614 contents at any time u greater than the currently addressed time t. If all subsequent time periods u of the currently addressed simulation x are checked and fail to reveal any other non-zero right valuation field 614 contents, then blocks 238 and 240 effectively direct the processor circuit 102 to increment the simulation counter x, and the processor circuit 102 is returned to block 214 to address the next simulated scenario record.

Conversely, however, if at block 222 a subsequent time period u is identified for which the currently addressed simulation x has non-zero right valuation field 614 contents, then blocks 228 to 236 effectively direct the processor circuit to compare the predicted exercise value of the right at time t to the predicted exercise value of the right at subsequent time u, to predict whether the borrower will exercise the right at time t or whether the borrower will wait until time u to exercise the right.

More particularly, in this embodiment blocks 228 to 232 effectively direct the processor circuit 102 to calculate an expected value of waiting until subsequent time u to exercise the right, and to compare that expected value of waiting to the immediate value of exercising the right at time t. In this regard, comparing an expected value of waiting until time u to the immediate value of exercise at time t is more appropriate than directly comparing the immediate values of exercise at times t and u (i.e. the field contents 614 at times t and u), as the latter comparison would fail to factor in an interest rate discount, to account for the fact that anything having a future value Z at a future time u will have a present value less than Z (e.g. present value=Z/(1+r) where r is the effective rate of interest between the present time and the future time u). One way to provide such a discount would be to simply discount the right valuation field contents by the appropriate interest rate (e.g., if t=N−1 and u=N, then the discounted value at time t=N−1 of the predicted exercise value $PP_N$ at time u=N would simply be $DV=PP_N/(1+r_{N-1})$. However, to calculate an expected value of waiting in this manner would be strongly influenced by the randomness of the numbers ($\epsilon_v, \epsilon_r$) that were used to generate the specific predicted value $V_N$ upon which the predicted exercise value $PP_N$ for the particular simulated scenario is based.

Therefore, in this embodiment, to provide a more realistic "expected" value of waiting until time u, the expected value of waiting between two given time periods in a particular simulated scenario is calculated in a manner that takes advantage of parameters derived from other simulated scenarios, to even out such randomness. More particularly, in this embodiment the expected value of waiting from one time period n−1 to an adjacent subsequent time period n, which in a specific case may be expressed as:

$$EVW_{n-1,n} = \frac{PP_n}{1+r_{n-1}} \tag{16}$$

is modeled as a $2^{nd}$-degree polynomial function of the interest rate r and the asset value v:

$$EVW_{n-1,n} = b_0 + b_1 r_{n-1} + b_2 r_{n-1}^2 + b_3 v_{n-1} + b_4 v_{n-1}^2 \tag{17}$$

Alternatively, if desired, other models may be substituted. For example, a third-degree polynomial term $b_5 v^3$ may be included, potentially providing greater modeling accuracy at the expense of greater processing overhead.

Figure 7:
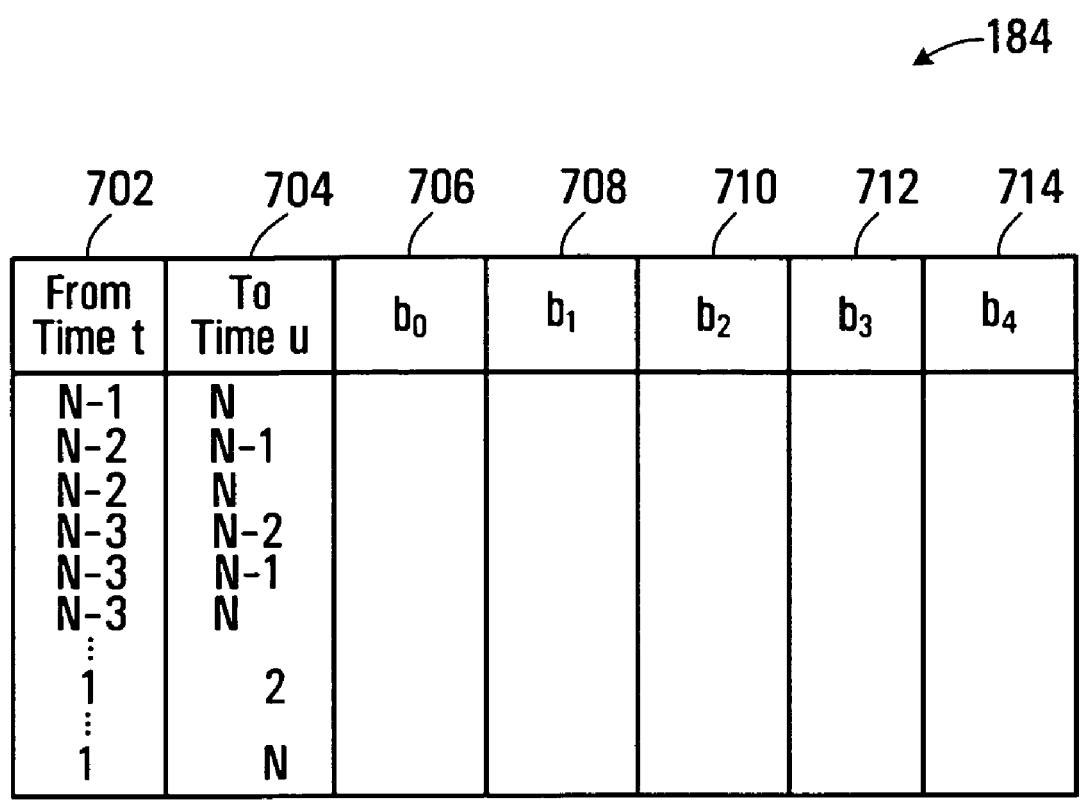
FIG. 7 is a tabular representation of a configuration of a waiting parameters store of the apparatus shown in FIG. 1.

Referring to FIGS. 1, 2A and 7, in this embodiment, to identify the parameters $b_0$, $b_1$, $b_2$, $b_3$ and $b_4$, block 228 first directs the processor circuit 102 to inspect the contents of the waiting parameters store 184 to determine whether the parameters for waiting between the currently addressed time t and the subsequent addressed time u have already been generated and stored in the waiting parameters store 184. In this regard, such parameters are generated by the processor circuit 102 under the direction of block 228 the first time a simulation record is encountered that has non-zero right valuation field 614 contents for time t and time u, and need not be re-generated when subsequent simulation records having non-zero right valuation field contents for times t and u are encountered.

In this embodiment, if no such parameters for waiting from time t to time u have been previously generated and stored, block 228 directs the processor circuit 102 to generate these parameters and store them in a corresponding record in the waiting parameters store 184. To achieve this, in this embodiment block 228 directs the processor circuit to execute one of the calculation routines 114. More particularly, in this embodiment block 228 directs the processor circuit 102 to execute a REGRESS function in MATLAB™, with input commands and input data appropriate to the number of time periods separating the presently addressed time periods t and u. For example, where u and t are adjacent time periods, i.e. u=t+1, the REGRESS function may be invoked by specifying:

$$b = \text{regress}(y, x) \qquad (18)$$

$$y \leftrightarrow \frac{PP_{t+1}}{1+r_t}$$

$$x \leftrightarrow \begin{pmatrix} 1 & r_t & r_t^2 & v_t & v_t^2 \\ 1 & r_t & r_t^2 & v_t & v_t^2 \\ 1 & r_t & r_t^2 & v_t & v_t^2 \\ \vdots & \vdots & \vdots & \vdots & \vdots \\ 1 & r_t & r_t^2 & v_t & v_t^2 \end{pmatrix}$$

wherein the y-matrix is a single-column matrix, with each row entry having a numerator $PP_{t+1}$=the contents of the right valuation field 614 at time u and a denominator equal to unity plus the contents of the interest rate field 612 at time t, for a particular simulation scenario having non-zero right valuation field 614 contents at both times t and u; and each row of the x-matrix is generated from the interest rate field 612 and predicted asset value field 610 at time t for all simulation scenarios having non-zero right valuation field 614 contents at both times t and u.

To produce the above inputs to the REGRESS function, block 228 directs the processor circuit to examine the contents of the simulation number field 602, the time field 604 and the right valuation field 614. Upon identifying each particular simulation number that has non-zero right valuation field 614 contents at both time t and time u, block 228 directs the processor circuit to generate a new corresponding entry in the y-matrix and a new corresponding row in the x-matrix. The new corresponding entry in the y-matrix consists of the right valuation field 614 contents at time u, divided by unity plus the interest rate field 612 contents at time t for the identified simulation. The contents of the new corresponding row in the x-matrix include "1" in column 1, the interest rate field 612 contents at time t in column 2, the square of the latter in column 3, the predicted asset value field 610 contents in column 4, and the square of the latter in column 5. Block 228 continues to direct the processor circuit 102 to generate rows of the y-matrix and the x-matrix in this manner, until a corresponding y-matrix row and a corresponding x-matrix row have been generated for every simulated scenario having non-zero right valuation field 614 contents at both time t and time u. (Alternatively, if a third-degree polynomial term $b_5 v^3$ is included in the model for the expected value of waiting, a sixth column $v_t^3$ may also be included in the x-matrix.) Block 228 directs the processor circuit 102 to store the resulting y-matrix and x-matrix in the waiting regression data store 182, following which block 228 directs the processor circuit to invoke the REGRESS function of MATLAB™ as described above. The execution of the REGRESS function generates the desired parameters $b_0$, $b_1$, $b_2$, $b_3$ and $b_4$. Block 228 then directs the processor circuit 102 to generate a new corresponding record in the waiting parameters store 184. More particularly, block 228 directs the processor circuit to store the time t in a "from time" field 702, the time u in a "to time" field 704, and the parameters $b_0$, $b_1$, $b_2$, $b_3$ and $b_4$ in respective parameter fields 706, 708, 710, 712 and 714. Thus, once the parameters corresponding to waiting from time t to time u have been generated and stored in this manner, the processor circuit may simply read the required parameters from the waiting parameters store 184 if the processor circuit encounters a subsequent simulated scenario having non-zero right valuation field 614 contents at both times t and u, rather than re-generating these parameters.

Alternatively, if t and u are not adjacent time periods, then block 228 directs the processor circuit 102 to invoke the REGRESS function in a slightly different manner. In particular, the y-matrix input to the REGRESS function becomes:

$$y \leftrightarrow \frac{PP_u}{(1+r_t)(1+r_{t+1})\ldots(1+r_u)} \qquad (19)$$

In this embodiment, after either reading or generating the parameters $b_0$, $b_1$, $b_2$, $b_3$ and $b_4$ at block 228, block 230 then directs the processor circuit 102 to use these parameters to calculate an expected value of waiting from time t until time u to exercise the right. To achieve this, block 230 directs the processor circuit 102 to locate the record in the waiting parameters store 184 having "from time" contents t and "to time" contents u, and to read the corresponding parameters $b_0$, $b_1$, $b_2$, $b_3$ and $b_4$ from the fields 706, 708, 710, 712 and 714 of the located record. Block 230 then directs the processor circuit 102 to calculate the expected value of waiting from time t to time u for the presently addressed simulated scenario as:

$$EVW_{t,u} = b_0 + b_1 r_t + b_2 r_t^2 + b_3 v_t + b_4 v_t^2 \qquad (20)$$

Block 230 directs the processor circuit 102 to temporarily store the expected value of waiting $EVW_{t,u}$ in the expected value of waiting register 186, for subsequent use at block 232 below. It will be appreciated that the expected value of waiting EVW generated in this manner is inherently discounted, as interest rate discounts were factored into the REGRESS function that generated the parameters $b_0$, $b_1$, $b_2$, $b_3$ and $b_4$, via the denominators of the elements of the y-matrix inputted to the REGRESS function.

In this embodiment, for the presently addressed simulation (addressed via the present value of simulation counter x), block 232 then directs the processor circuit 102 to compare the expected value of waiting until time u to exercise the option, to the immediate value of exercising the option at time t.

If the contents $EVW_{t-u}$ of the expected value of waiting register 186 are greater than the contents of the right valuation field 614 at time t for the presently addressed simulation, then it is predicted that the borrower will wait until time u to exercise the right, rather than exercising it immediately at time t. To reflect this prediction and probability, in this embodiment block 236 directs the processor circuit 102 to set the contents of the right valuation field 614 at time t and the prediction flag field 616 at time t for the presently addressed simulation equal to zero. The prediction flag field 616 at subsequent time u will have already been set active when the non-zero right valuation field 614 contents were generated; if desired, as a precautionary measure, the prediction flag field 616 at time u may be redundantly set active again at block 236.

Conversely, however, if the contents $EVW_{t-u}$ of the expected value of waiting register 186 are not greater than the contents of the right valuation field 614 at time t for the presently addressed simulation, then it is predicted that the borrower will immediately exercise the right at time t, rather than waiting until time u. To reflect this prediction and probability, in this embodiment block 234 directs the processor circuit 102 to set the contents of the right valuation field 614 at time u and the prediction flag field 616 at time u for the presently addressed simulation equal to zero. The prediction flag field 616 at the earlier time t will have already been set active when the non-zero right valuation field 614 contents were generated; if desired, as a precautionary measure, the prediction flag field 616 at time t may be redundantly set active again at block 234.

Referring to FIGS. 1, 2B and 6, in this embodiment, following execution of block 234 or 236, block 238 directs the processor circuit 102 to determine whether all M simulations (in this embodiment, 100,000 simulated scenarios) have been examined to determine whether their right valuation field 614 contents at the presently addressed time t are greater than zero. If not, block 240 directs the processor circuit 102 to increment the simulation counter x, and the processor circuit 102 is directed back to block 214 to continue searching for another simulation record having non-zero right valuation field 614 contents at time t.

In the present embodiment, once all simulation records have been checked for non-zero right valuation field 614 contents at time t, block 242 directs the processor circuit to determine whether the procedures discussed above in connection with blocks 210 to 240 have been carried out for all time periods t=N−1, t=N−2, t=N−3, . . . t=1. If not, block 244 directs the processor circuit 102 to decrement the time counter t, and the processor circuit is directed back to block 210, to calculate and store the contents of the right valuation fields 614 for the next earlier time period t.

Due to the order in which the above steps are carried out, it will be appreciated that once all processing has been completed at block 242 (t=1), each simulated scenario will contain no more than one time period having right valuation field 614 contents greater than zero. In this regard, when the comparison between a discounted expected value corresponding to a non-zero right valuation at time N and a non-zero immediate right valuation at time N−1, one of these two non-zero values will be reset to zero at either block 234 or block 236. Similarly, when the remaining one of these two values is subsequently compared to the next earlier non-zero right valuation in the simulation, one of these two compared values will be reset to zero at block 234 or 236, and so on, as progressively earlier times are considered. Thus, following final completion of processing at block 242, each simulation will either contain a single time at which its right valuation field 614 contents are non-zero, or alternatively, will have all of its right valuation fields 614 for all times equal to zero.

In either case, it will be appreciated that following final execution of block 242, a value of the right (whether zero or non-zero) has been generated and stored for each and every time period of each and every one of the plurality of simulated scenarios.

In this embodiment, following the final execution of block 242, block 246 directs the processor circuit 102 to determine the present value of the right in response to the plurality of values of the right at the plurality of respective times for the plurality of scenarios. More particularly, in this embodiment, at least for non-zero values of the plurality of values of the right at the plurality of respective times for the plurality of scenarios, block 246 directs the processor circuit to generate a plurality of corresponding discounted present values. More particularly still, in this embodiment block 246 first directs the processor circuit to initialize the contents of the sum of discounted present values register 188 to zero. Block 246 then directs the processor circuit to successively address the simulation records contained in the simulation store 180, for each one of the M simulations (in this embodiment, the 100,000 simulated scenarios). For each addressed simulation, if the simulation has any time period with non-zero right valuation field 614 contents (it will be recalled that only one such time period can exist within each simulation), block 246 directs the processor circuit 102 to discount the non-zero right valuation field 614 contents from time t back to the present time, to generate a corresponding discounted present value. In general, if a particular simulation has non-zero right valuation field 614 contents $PP_n$ at time n, the discounted present value of the right will be:

$$DPV_n = \frac{PP_n}{(1+r_0)(1+r_1)\ldots(1+r_{n-1})} \quad (21)$$

Block 246 directs the processor circuit 102 to add the discounted present value DPV to the contents of the sum of discounted present values register 188. Block 246 directs the processor circuit 102 to continue examining the simulation records in the simulation store 184 for all M simulations (in this embodiment, all 100,000 simulated scenarios), until discounted present values for all non-zero right valuation field 614 contents for all M simulations have been added to the contents of the sum of discounted present values register 188.

Referring to FIGS. 1, 2B, 3 and 6, in this embodiment, block 248 then directs the processor circuit to determine the present value of the right as an average of the discounted present values. More particularly, in this embodiment block 248 directs the processor circuit 102 to calculate the average by dividing the contents of the sum of discounted present values register 188 by the total number M of simulations, which in this embodiment is 100,000 (rather than merely the number of simulations for which a discounted present value was calculated at block 246). In this regard, the average thus effectively includes a potentially large number of simulations for which the predicted value of the right (as reflected by the right valuation field 614 contents) was zero throughout all times over the term of the loan. Block 248 directs the processor circuit to store the resulting average, which represents the present value of the right, in the present value of right register 190. Block 248 also directs the processor circuit to display the present value of right register 190 contents in the present value of right field 314 of the GUI window 300 shown in FIG. 3.

In the present embodiment, block 250 then directs the processor circuit 102 to examine the contents of the price adjustment register 192, to determine whether the user has specified a price adjustment to be added to the present value of the right, to arrive at the final sale priced of the right. If the contents of the price adjustment register 192 are non-zero, block 250 directs the processor circuit to add the contents of the price adjustment register 192 to the contents of the present value of right register 190, and to store the resulting sum in the sale price register 194. Block 250 also directs the processor circuit to display the contents of the sale price register 194 in the sale price field 318 of the GUI window 300.

The valuation routine 112 is then ended.

Other Illustrative Alternatives

Although the foregoing embodiment described a non-amortizing loan for ease of illustration, alternatively, the valuation routine 112 may be easily modified to account for amortization. For example, in equations (14) and (15) discussed above at blocks 208 and 210, a variable/amortizing outstanding principal balance $F_t$ may be substituted for the constant non-amortizing principal balance F. Methods for calculating the amortized principal balance that will remain from a known original principal balance after a known time at a known interest rate are well known in the art and need not be discussed herein.

Similarly, although a fixed rate loan was discussed herein for ease of illustration, alternatively, embodiments may be applied to variable rate loans, such as floating or variable rate mortgages, for example.

Although residential mortgages have been discussed by way of illustration, alternative embodiments may be applied to virtually any form of asset securing virtually any form of loan, as discussed earlier herein.

As discussed above, the structural details of the apparatus 100 and processor circuit 102 may be varied. Alternatively, other types of means for generating at least one prediction of whether a borrower of a loan secured by an asset will exercise a right to choose during a term of the loan to require an entity to pay the loan in full on the borrower's behalf in exchange for the asset, and other types of means for determining a present value of the right, in response to the at least one prediction, may be substituted.

If desired, further modifications or supplemental features may be provided.

For example, following a price drop, borrowers may be automatically alerted that it may be in their interest to exercise the right they have purchased. This may advantageously create and foster customer loyalty and highlight the usefulness of the financial product.

As a further illustrative example, an institutional relationship with appraisers may be offered to borrowers, to help borrowers decide whether they want to exercise their right. This enhances the usefulness of the product and creates a potential for additional revenue for the provider.

As a further example, information relevant to the exercise of such rights may be sold, with borrower permission, to brokers, or established relationships with brokers may be provided to borrowers, to assist such borrowers with selling their home or other asset or with purchasing a new home or asset, if they choose to exercise their right.

As a further example, following a real estate price decline, the entity that has granted such rights may offer borrowers various incentives to reduce the entity's potential exposure. For example, the entity may offer to the borrower a lump sum payment in exchange for the borrower agreeing to terminate its rights, or may offer smaller lump sum payments or other incentives for the borrower agreeing to either reduce the outstanding amount owing on the loan, or agreeing to a limit on the maximum liability of the entity if the right is exercised.

As yet another example, the entity may offer to connect the borrower to mortgage brokers, title insurance companies, or other entities that can facilitate the transactions related to exercising the right.

As yet another example, in markets that have appreciated in value and have generated equity for the borrowers/asset owners, the provider can alert the borrowers that they can refinance and purchase the right again at a higher loan balance.

Advantageously, specific embodiments of the invention relating to real estate may be marketed as a safeguard against real estate markets going down, rather than against adverse events affecting the owner's ability to pay. This is likely to become even more advantageous as real estate markets in the United States and elsewhere drop in value. Similar advantages may be achieved in other embodiments relating to loans secured by assets other than real estate whose values can significantly fluctuate over time.

Advantageously, in some embodiments, valuation of the right may be achieved independently of the borrower's subjective credit rating, and instead may be based on objective interest rate and asset valuation data, on the assumption that the borrower will behave rationally.

As a further illustrative example, the entity granting the right may also efficiently provide a precise and optimized real estate price index, for use in such valuations.

As a further illustrative example, investors who wish to "short" specific real estate markets can provide capital for the proposed instrument. In other words, the entity granting such rights can securitize its obligations. In this case, the entity becomes the market between those who wish to own real estate and those who wish to short the real estate market.

More generally, while specific embodiments of the invention have been described and illustrated, such embodiments should be considered illustrative of the invention only and not as limiting the invention as construed in accordance with the accompanying claims.

What is claimed is:

1. A computer-implemented method comprising:
generating, with a processor circuit of a computer, at least one prediction of whether a borrower will exercise a right to choose during a term of a loan secured by an asset to require an entity to pay the loan in full on the borrower's behalf in exchange for the asset; and
determining, with the processor circuit, a present value of the right, in response to the at least one prediction, wherein determining comprises determining the present value of the right in response to a plurality of values of the right at a plurality of respective times for a plurality of scenarios, and wherein determining further comprises:
i) at least for non-zero values of the plurality of values of the right at the plurality of respective times for the plurality of scenarios, generating a plurality of corresponding discounted present values; and
ii) determining the present value of the right as an average of the discounted present values.

2. A computer-readable medium storing: instruction codes for directing a processor circuit to determine, in respect of a loan secured by an asset, a present value of a right of a borrower of the loan to choose during a term of the loan to require an entity to pay the loan in full on the borrower's behalf in exchange for the asset, in response to at least one prediction of whether the borrower will exercise the right, wherein the instruction codes direct the processor circuit to determine the present value of the right in response to a plurality of values of the right at a plurality of respective times for a plurality of scenarios, and wherein the instruction codes further direct the processor circuit to determine the present value of the right by:
i) at least for non-zero values of the plurality of values of the right at the plurality of respective times for the plurality of scenarios, generating a plurality of corresponding discounted present values; and
ii) determining the present value of the right as an average of the discounted present values.

3. The computer-readable medium of claim 2, wherein the instruction codes comprise instruction codes for directing the processor circuit to generate the at least one prediction in response to a present value of the asset and an interest rate of the loan.

4. The computer-readable medium of claim 3, wherein the instruction codes comprises instruction codes for directing the processor circuit to:
generate a plurality of predictions whether the borrower will exercise the right at the plurality of respective times during the term of the loan;
simulate the plurality of scenarios, each scenario reflecting possible changes in value of the asset and in interest rates over the term of the loan, and generate the plurality of predictions whether the borrower will exercise the right at the plurality of respective times, for each one of the plurality of scenarios.

5. An apparatus comprising: a processor circuit configured to determine, in respect of a loan secured by an asset, a present value of a right of a borrower of the loan to choose during a term of the loan to require an entity to pay the loan in full on the borrower's behalf in exchange for the asset, in response to at least one prediction of whether the borrower will exercise the right, wherein the processor circuit is configured to determine the present value of the right in response to a plurality of values of the right at a plurality of respective times for a plurality of scenarios, and wherein the processor circuit is configured to determine the present value of the right by:
  i) at least for non-zero values of the plurality of values of the right at the plurality of respective times for the plurality of scenarios, generating a plurality of corresponding discounted present values; and
  ii) determining the present value of the right as an average of the discounted present values.

6. An apparatus comprising:
  a) means for generating at least one prediction of whether a borrower of a loan secured by an asset will exercise a right to choose during a term of the loan to require an entity to pay the loan in full on the borrower's behalf in exchange for the asset; and
  b) means for determining a present value of the right, in response to the at least one prediction, wherein the means for determining comprises means for determining the present value of the right in response to a plurality of values of the right at a plurality of respective times for a plurality of scenarios, and wherein the means for determining further comprises:
    i) at least for non-zero values of the plurality of values of the right at the plurality of respective times for the plurality of scenarios, means for generating a plurality of corresponding discounted present values; and
    ii) means for determining the present value of the right as an average of the discounted present values.

7. The apparatus of claim 6, wherein the means for generating comprises means for generating the at least one prediction in response to a present value of the asset and an interest rate of the loan.

8. The apparatus of claim 7, wherein the means for generating comprises means for generating a plurality of predictions whether the borrower will exercise the right at the plurality of respective times during the term of the loan.

9. The apparatus of claim 8, further comprising means for identifying a value of the right at each one of the plurality of respective times.

10. The apparatus of claim 8, wherein the means for generating comprises means for simulating the plurality of scenarios, each scenario reflecting possible changes in value of the asset and in interest rates over the term of the loan, and means for generating the plurality of predictions whether the borrower will exercise the right at the plurality of respective times, for each one of the plurality of scenarios.

11. The apparatus of claim 10, wherein the means for simulating comprises means for simulating at least $2 \times 10^4$ scenarios.

12. The apparatus of claim 10, wherein the means for simulating comprises means for simulating at least $1 \times 10^5$ scenarios.

13. The apparatus of claim 10, wherein the means for simulating comprises means for simulating the plurality of scenarios in response to previous data representing previous changes in values of similar types of assets and previous changes in interest rates.

14. The apparatus of claim 13, wherein the means for simulating comprises means for modeling the possible changes in value of the asset over the term of the loan as a function including parameters derived from the previous data and a random variable.

15. The apparatus of claim 13, wherein the means for simulating comprises means for modeling the possible changes in interest rates over the term of the loan as a function including parameters derived from the previous data and a random variable.

16. The apparatus of claim 10, further comprising means for identifying the plurality of values of the right at the plurality of respective times for each one of the plurality of scenarios.

17. The apparatus of claim 6, wherein the means for determining comprises means for determining the present value of the right in respect of a mortgage secured by realty.

* * * * *